(12) United States Patent
Park et al.

(10) Patent No.: US 9,203,083 B2
(45) Date of Patent: Dec. 1, 2015

(54) NEGATIVE ELECTRODE ACTIVE MATERIAL FOR RECHARGEABLE LITHIUM BATTERY, METHOD FOR PREPARING THE SAME, AND RECHARGEABLE LITHIUM BATTERY INCLUDING THE SAME

(71) Applicant: UNIST Academy-Industry Research Corporation, Ulsan (KR)

(72) Inventors: Soojin Park, Ulsan (KR); Jaephil Cho, Ulsan (KR)

(73) Assignee: UNIST ACADEMY-INDUSTRY RESEARCH CORPORATION, Ulsan (KR)

( * ) Notice: Subject to any disclaimer, the term of this patent is extended or adjusted under 35 U.S.C. 154(b) by 164 days.

(21) Appl. No.: 13/940,358

(22) Filed: Jul. 12, 2013

(65) Prior Publication Data

US 2014/0050987 A1    Feb. 20, 2014

(30) Foreign Application Priority Data

Aug. 14, 2012 (KR) ........................ 10-2012-0089131

(51) Int. Cl.
| | |
|---|---|
| H01M 4/36 | (2006.01) |
| H01M 4/13 | (2010.01) |
| H01M 4/38 | (2006.01) |
| H01M 4/48 | (2010.01) |
| H01M 4/587 | (2010.01) |
| H01M 10/052 | (2010.01) |
| H01M 4/04 | (2006.01) |

(52) U.S. Cl.
CPC ............ *H01M 4/366* (2013.01); *H01M 4/0402* (2013.01); *H01M 4/0471* (2013.01); *H01M 4/13* (2013.01); *H01M 4/386* (2013.01); *H01M 4/48* (2013.01); *H01M 4/587* (2013.01); *H01M 4/387* (2013.01); *H01M 10/052* (2013.01); *Y02E 60/122* (2013.01)

(58) Field of Classification Search
None
See application file for complete search history.

(56) References Cited

U.S. PATENT DOCUMENTS

2005/0233213 A1*   10/2005   Lee et al. ................... 429/218.1
2014/0030602 A1      1/2014   Park et al.

FOREIGN PATENT DOCUMENTS

| CN | 101891202 | 11/2010 |
|---|---|---|
| CN | 102185142 | 9/2011 |
| JP | 2012033317 A * | 2/2012 |
| KR | 10-1114492 | 2/2012 |

(Continued)

OTHER PUBLICATIONS

K-PION machine translation of KR 10-2012-0089512A (Aug. 13, 2012).*

(Continued)

*Primary Examiner* — Gregg Cantelmo
(74) *Attorney, Agent, or Firm* — Lex IP Meister, PLLC

(57) ABSTRACT

Disclosed are a negative active material for a rechargeable lithium battery that includes a core including a material being capable of doping and dedoping lithium, an oxide layer of the material being capable of doping and dedoping lithium formed on the exterior of the core including a material being capable of doping and dedoping lithium, and a carbon layer formed on the exterior of the oxide layer of the material being capable of doping and dedoping lithium, a method for preparing a negative active material for a rechargeable lithium battery, and a rechargeable lithium battery including the same.

7 Claims, 10 Drawing Sheets

(56) References Cited

FOREIGN PATENT DOCUMENTS

| | | |
|---|---|---|
| KR | 10-2012-0089512 | 8/2012 |
| KR | 10-2012-0139450 | 12/2012 |
| WO | 2011/135649 | 11/2011 |

OTHER PUBLICATIONS

J-PlatPat machine translation of JP 2012-033317A (Feb. 2012).*
Liwei Su et. al., "Core-double-shell Si@SiO2@C nanocomposites as anode materials for Li-ion batteries", <Chem. Commun>, vol. 46, Feb. 5, 2010, p. 2590-2592.

* cited by examiner

NEGATIVE ELECTRODE ACTIVE MATERIAL FOR RECHARGEABLE LITHIUM BATTERY, METHOD FOR PREPARING THE SAME, AND RECHARGEABLE LITHIUM BATTERY INCLUDING THE SAME

CROSS-REFERENCE TO RELATED APPLICATION

This application claims priority to and the benefit of Korean Patent Application No. 10-2012-0089131 filed in the Korean Intellectual Property Office on Aug. 14, 2012, the entire contents of which are incorporated herein by reference.

BACKGROUND OF THE INVENTION (a) Field of the Invention

A negative active material for rechargeable lithium battery, a method for preparing a negative active material for a rechargeable lithium battery, and a rechargeable lithium battery including the same are disclosed.

(b) Description of the Related Art

Lithium rechargeable batteries have recently drawn attention as a power source for small portable electronic devices. The lithium rechargeable batteries use an organic electrolyte solution and thereby have twice as high a discharge voltage as a conventional battery using an alkali aqueous solution, and accordingly, have high energy density.

As for a positive active material for a lithium rechargeable battery, a lithium-transition metal oxide being capable of intercalating lithium such as $LiCoO_2$, $LiMn_2O_4$, $LiNi_{1-x}Co_xO_2$ (0<x<1), and the like has been used.

As for a negative active material for a lithium rechargeable battery, various carbon-based materials such as artificial graphite, natural graphite, and hard carbon capable of intercalating and deintercalating lithium ions have been used.

Since graphite among the carbon-based materials has a low discharge potential relative to lithium of about −0.2 V, a battery using the graphite as a negative active material has a high discharge potential of about 3.6 V and excellent energy density.

Furthermore, the graphite guarantees a long cycle life for a battery due to its outstanding reversibility. However, a graphite active material has a low density and consequently a low capacity (theoretical density: about 2.2 g/cc) in terms of energy density per unit volume when using the graphite as a negative active material.

Further, a battery may be swelled and thus have decreased capacity, because graphite is likely to react with an organic electrolyte at a high discharge voltage.

In order to solve these problems, a great deal of research on an oxide negative active material such as silicon, tin, and the like has recently been performed.

A silicon-based negative active material has an advantage of realizing high capacity when it reacts with lithium ions but problems of weak contact with a current collector and deteriorating capacity due to a volume change of greater than or equal to about 300% during charge and discharge.

In addition, silicon has low electrical conductivity and no smooth charge transfer reaction when intercalating/deintercalating lithium.

In order to solve the problems, a great deal of research has been made, and in particular, research on coating a material that does not react with carbon or lithium on the surface of silicon is actively being made.

SUMMARY OF THE INVENTION

A negative active material for a rechargeable lithium battery that may realize high capacity and excellent cycle-life characteristics, a method for preparing a negative active material for a rechargeable lithium battery, and a rechargeable lithium battery including the same are provided.

In one embodiment of the present invention, a negative active material for a rechargeable lithium battery includes a core including a material being capable of doping and dedoping lithium, an oxide layer of the material being capable of doping and dedoping lithium formed on the exterior of the core including a material being capable of doping and dedoping lithium, and a carbon layer formed on the exterior of the oxide layer of the material being capable of doping and dedoping lithium.

The material being capable of doping and dedoping lithium may include Si, $SiO_{x1}$, a Si—C composite, a Si-Q alloy, Sn, $SnO_{x2}$, a Sn—C composite, Sn—R, or a combination thereof.

The x1 and x2 may be in the ranges of 0<x1<2 and 0<x2<2, the Q may be an alkali metal, an alkaline-earth metal, a Group 13 to 16 element, a transition metal, a rare earth element, or a combination thereof, and excludes Si from the Q, and the R may be an alkali metal, an alkaline-earth metal, a Group 13 to 16 element, a transition metal, a rare earth element, or a combination thereof, and excludes Sn from the R.

The material being capable of doping and dedoping lithium may include Si, $SiO_{x1}$, a Si—C composite, or a Si-Q alloy.

The x1 may be in the range of 0<x1<2, and the Q may be an alkali metal, an alkaline-earth metal, a Group 13 to 16 element, a transition metal, a rare earth element, or a combination thereof, and excludes Si from the Q.

The material being capable of doping and dedoping lithium may have a powder shape, a wafer shape, a nanotube shape, a nanorod shape, or a nanowire shape.

The material being capable of doping and dedoping lithium may be porous.

The oxide layer of the material being capable of doping and dedoping lithium may include a compound represented by the following Chemical Formula 1.

$$Si_xM_yO_z \qquad \text{[Chemical Formula 1]}$$

In the above Chemical Formula 1,

M is an alkali metal, an alkaline-earth metal, a Group 13 to 16 element, a transition metal, a rare earth element, or a combination thereof, $0.9 \le x \le 0.99$, $0 \le y \le 0.05$, and $0.01 \le z \le 0.1$.

The oxide layer of the material being capable of doping and dedoping lithium may include silica ($SiO_2$).

The oxide layer of the material being capable of doping and dedoping lithium may have a thickness of about 5 to about 30 nm.

The carbon layer may have a thickness of about 5 to about 50 nm.

The negative active material for rechargeable lithium battery may be porous.

In another embodiment of the present invention, a method for preparing a negative active material for a rechargeable lithium battery includes: preparing a material being capable of doping and dedoping lithium; heat-treating the material being capable of doping and dedoping lithium to form an oxide layer of the material being capable of doping and dedoping lithium on the exterior of the material being capable of doping and dedoping lithium; and forming a carbon layer on the exterior of the oxide layer of the material being capable of doping and dedoping lithium.

The material being capable of doping and dedoping lithium may include Si, $SiO_{x1}$, a Si—C composite, a Si-Q alloy, Sn, $SnO_{x2}$, a Sn—C composite, Sn—R, or a combination thereof.

The x1 and x2 may be in the ranges of $0<x1<2$ and $0<x2<2$, the Q may be an alkali metal, an alkaline-earth metal, a Group 13 to 16 element, a transition metal, a rare earth element, or a combination thereof, and excludes Si from the Q, and the R may be an alkali metal, an alkaline-earth metal, a Group 13 to 16 element, a transition metal, a rare earth element, or a combination thereof, and excludes Sn from the R.

The material being capable of doping and dedoping lithium may include Si, $SiO_{x1}$, a Si—C composite, or a Si-Q alloy.

The x1 may be in the range of $0<x1<2$, and the Q may be an alkali metal, an alkaline-earth metal, a Group 13 to 16 element, a transition metal, a rare earth element, or a combination thereof, and excludes Si from the Q.

The material being capable of doping and dedoping lithium may have a powder shape, a wafer shape, a nanotube shape, a nanorod shape, or a nanowire shape.

The material being capable of doping and dedoping lithium may be porous.

The oxide layer of the material being capable of doping and dedoping lithium may include a compound represented by the following Chemical Formula 1.

$$Si_xM_yO_z \quad \text{[Chemical Formula 1]}$$

In the above Chemical Formula 1, M is an alkali metal, an alkaline-earth metal, a Group 13 to 16 element, a transition metal, a rare earth element, or a combination thereof, $0.9 \le x \le 0.99$, $0 \le y \le 0.05$, and $0.01 \le z \le 0.1$.

The oxide layer of the material being capable of doping and dedoping lithium may have a thickness of about 5 to about 30 nm.

The carbon layer may have a thickness of about 5 to about 50 nm.

The negative active material for rechargeable lithium battery may be porous.

The material being capable of doping and dedoping lithium may be prepared by etching the material being capable of doping and dedoping lithium using an etching solution, and forming a pore in the material being capable of doping and dedoping lithium.

The etching solution may include hydrogen peroxide ($H_2O_2$), hydrogen fluoride (HF), potassium hydroxide (KOH), sodium hydroxide (NaOH), nitric acid ($HNO_3$), potassium permanganate ($KMnO_4$), isopropyl alcohol (IPA), or a combination thereof.

The etching solution may have a concentration of about 1 to about 10 M.

The material being capable of doping and dedoping lithium may be prepared by etching the material being capable of doping and dedoping lithium using an etching solution and a catalyst to form a pore in the material being capable of doping and dedoping lithium.

The catalyst may include a metal.

The material being capable of doping and dedoping lithium may be prepared by supporting a metal particle on a surface of the material being capable of doping and dedoping lithium, and etching the material being capable of doping and dedoping lithium on which the metal particle is supported.

The metal particle may be supported on the surface of the material being capable of doping and dedoping lithium by using electroless plating, physical vapor deposition, chemical vapor deposition, thermal deposition, e-beam deposition, sputtering, a method using an organic capping agent, or a combination thereof.

The metal particle may include gold, silver, platinum, copper, nickel, aluminum, or a combination thereof.

The process of heat-treating the material being capable of doping and dedoping lithium to form an oxide layer of the material being capable of doping and dedoping lithium on the exterior of the material being capable of doping and dedoping lithium may be performed under an air atmosphere.

The process of heat-treating the material being capable of doping and dedoping lithium to form an oxide layer of the material being capable of doping and dedoping lithium on the exterior of the material being capable of doping and dedoping lithium may be performed at about 500 to about 1000° C.

The process of forming a carbon layer on the exterior of the oxide layer of the material being capable of doping and dedoping lithium may be performed by mixing the material being capable of doping and dedoping lithium formed on the exterior of the oxide layer of the material being capable of doping and dedoping lithium, and a carbon raw material.

The carbon raw material may include an acetylene gas, an ethylene gas, sucrose, glucose, polyacrylonitrile, polyvinyl alcohol, polyvinylpyrrolidone, colloidal carbon, citric acid, tartaric acid, glycolic acid, polyacrylic acid, adipic acid, glycine, or a combination thereof.

The process of forming a carbon layer on the exterior of the oxide layer of the material being capable of doping and dedoping lithium may further include heat-treating.

The heat-treating may be performed at about 800 to about 1000° C.

The process of forming a carbon layer on the exterior of the oxide layer of the material being capable of doping and dedoping lithium may be performed under a nitrogen or inert gas atmosphere.

In yet another embodiment of the present invention, a rechargeable lithium battery includes: a negative electrode including the negative active material for a rechargeable lithium battery; a positive electrode including a positive active material; a separator interposed between the negative electrode and positive electrode; and an electrolyte.

In still another embodiment of the present invention, a rechargeable lithium battery includes: a negative electrode including the negative active material for a rechargeable lithium battery prepared by the method for preparing a negative active material for rechargeable lithium battery; a positive electrode including a positive active material; a separator interposed between the negative electrode and positive electrode; and an electrolyte.

The negative active material for rechargeable lithium battery according to one embodiment of the present invention may suppress expansion of an active material effectively, and has improved battery conductivity. A rechargeable lithium battery including such a negative active material may realize high capacity and excellent cycle-life characteristics.

The method for preparing a negative active material for a rechargeable lithium battery according to another embodiment of the present invention and a rechargeable lithium battery including the negative active material prepared according to the method may realize high capacity and excellent cycle-life characteristics.

DETAILED DESCRIPTION

Figure 1:
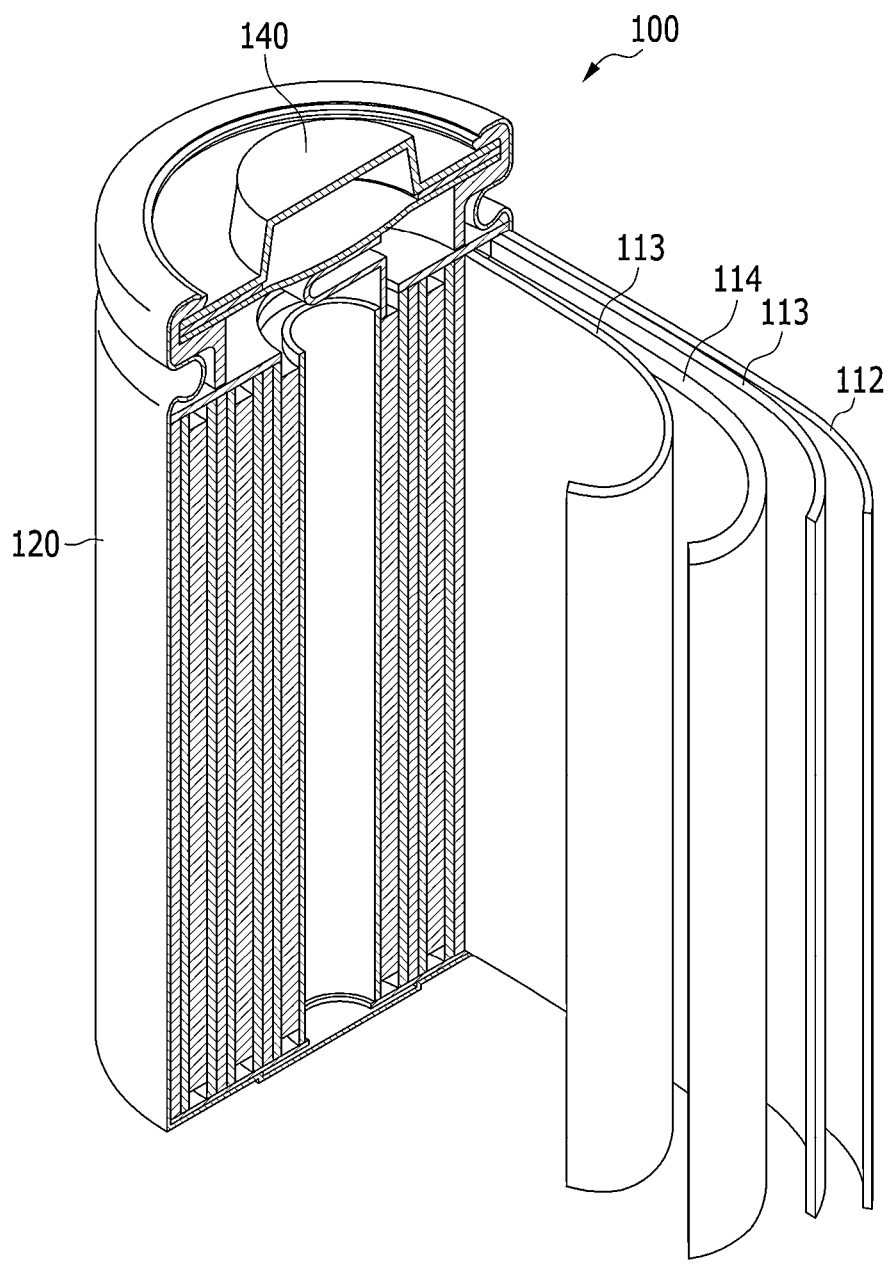
FIG. 1 is an exploded perspective view showing a rechargeable lithium battery according to one embodiment.

Hereinafter, embodiments of the present invention are described in detail. However, these embodiments are exemplary, and this disclosure is not limited thereto.

In one embodiment of the present invention, a negative active material for a rechargeable lithium battery includes a core including a material being capable of doping and dedoping lithium, an oxide layer of the material being capable of doping and dedoping lithium formed on the exterior of the core including a material being capable of doping and dedoping lithium, and a carbon layer formed on the exterior of the oxide layer of the material being capable of doping and dedoping lithium.

The negative active material for a rechargeable lithium battery includes double shells formed on a core.

The material being capable of doping and dedoping lithium may include Si, $SiO_{x1}$, a Si—C composite, a Si-Q alloy, Sn, $SnO_{x2}$, a Sn—C composite, Sn—R, or a combination thereof.

The x1 and x2 may be in the ranges of 0<x1<2 and 0<x2<2,

The Q may be an alkali metal, an alkaline-earth metal, a Group 13 to 16 element, a transition metal, a rare earth element, or a combination thereof, and excludes Si from the Q, and the R may be an alkali metal, an alkaline-earth metal, a Group 13 to 16 element, a transition metal, a rare earth element, or a combination thereof, and excludes Sn from the R.

Specific elements of the Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The material being capable of doping and dedoping lithium may have a powder shape, a wafer shape, a nanotube shape, a nanorod shape, or a nanowire shape.

The material being capable of doping and dedoping lithium may be porous. In this case, contact areas between a negative active material and an electrolyte may become wide. Thereby, lithium ions and an electrolyte may reach the negative active material easily, and high rate capability may be effectively improved. In addition, pulverization due to volume expansion and shrinkage during lithium intercalation and deintercalation may be suppressed or alleviated.

The oxide layer of the material being capable of doping and dedoping lithium may suppress or alleviate pulverization of the material being capable of doping and dedoping lithium effectively, and a side reaction between the material being capable of doping and dedoping lithium and an electrolyte may be suppressed or alleviated effectively, even though the volume of the material being capable of doping and dedoping lithium changes by lithium intercalation and deintercalation.

The oxide layer of the material being capable of doping and dedoping lithium may be formed on a part or the whole exterior of the core including a material being capable of doping and dedoping lithium. When the material being capable of doping and dedoping lithium is porous, the oxide layer of the material being capable of doping and dedoping lithium may be formed on a part or all of the pore.

The oxide layer of the material being capable of doping and dedoping lithium may include a compound represented by the following Chemical Formula 1.

$$Si_xM_yO_z \quad \text{[Chemical Formula 1]}$$

In the above Chemical Formula 1,

M is an alkali metal, an alkaline-earth metal, a Group 13 to 16 element, a transition metal, a rare earth element, or a combination thereof, 0.9≤x≤0.99, 0≤y≤0.05, and 0.01≤z≤0.1.

The M may be specifically Na, K, Rb, Cs, Fr, Be, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The oxide layer of the material being capable of doping and dedoping lithium may include silica ($SiO_2$).

The oxide layer of the material being capable of doping and dedoping lithium may have a thickness of about 5 to about 30 nm. Specifically, the oxide layer may have a thickness of about 5 to about 25 nm, about 5 to about 20 nm, about 5 to about 15 nm, about 10 to about 30 nm, or about 10 to about 25 nm. When the oxide layer of the material being capable of doping and dedoping lithium has a thickness within the range, pulverization of the material being capable of doping and dedoping lithium may be suppressed or alleviated effectively and a side reaction between the material being capable of doping and dedoping lithium and an electrolyte may be suppressed or alleviated effectively, even though the volume of the material being capable of doping and dedoping lithium changes by lithium intercalation and deintercalation.

The carbon layer may suppress or alleviate pulverization of the material being capable of doping and dedoping lithium effectively and a side reaction between the material being capable of doping and dedoping lithium and an electrolyte may be suppressed or alleviated effectively, even though the volume of the material being capable of doping and dedoping lithium changes by lithium intercalation and deintercalation. The negative active material for rechargeable lithium battery has excellent conductivity, and thus easily reacts with lithium.

The carbon layer may include amorphous carbon. Thereby, even though the volume of the material being capable of doping and dedoping lithium changes by lithium intercalation and deintercalation, pulverization of the material being capable of doping and dedoping lithium may be suppressed or alleviated effectively, and a side reaction between the material being capable of doping and dedoping lithium and an electrolyte may be suppressed or alleviated effectively.

The carbon layer may be formed on a part of whole exterior of the oxide layer of the material being capable of doping and dedoping lithium. When the material being capable of doping and dedoping lithium is porous, the carbon layer may be formed on a part or all of the pore.

The carbon layer may have a thickness of about 5 to about 50 nm. Specifically, the carbon layer may have a thickness of about 5 to about 45 nm, about 5 to about 40 nm, about 5 to about 35 nm, about 10 to about 50 nm, about 10 to about 45 nm, about 10 to about 40 nm, or about 10 to about 35 nm.

When the carbon layer has a thickness within the range, pulverization of the material being capable of doping and dedoping lithium may be suppressed or alleviated effectively and a side reaction between the material being capable of doping and dedoping lithium and an electrolyte may be suppressed or alleviated effectively, even though the volume of the material being capable of doping and dedoping lithium changes by lithium intercalation and deintercalation. The negative active material for a rechargeable lithium battery may have excellent conductivity, and may easily react with lithium.

The negative active material for a rechargeable lithium battery may be porous. In this case, contact areas between a negative active material and an electrolyte may become wide. Thereby, lithium may reach the negative active material easily, and high rate capability may be effectively improved. In addition, pulverization due to volume expansion and shrinkage during lithium intercalation and deintercalation may be suppressed or alleviated.

In another embodiment of the present invention, a method for preparing a negative active material for a rechargeable lithium battery includes: preparing a material being capable of doping and dedoping lithium;

heat-treating the material being capable of doping and dedoping lithium to form an oxide layer of the material being capable of doping and dedoping lithium on the exterior of the material being capable of doping and dedoping lithium; and forming a carbon layer on the exterior of the oxide layer of the material being capable of doping and dedoping lithium.

The material being capable of doping and dedoping lithium is the same as in the negative active material for a rechargeable lithium battery according to one embodiment of the present invention described above, and thus descriptions thereof are omitted.

The material being capable of doping and dedoping lithium may be prepared by etching the material being capable of doping and dedoping lithium using an etching solution, and forming a pore in the material being capable of doping and dedoping lithium.

The material being capable of doping and dedoping lithium includes pores therein, and thereby the negative active material for a rechargeable lithium battery prepared according to the preparation method has excellent capacity characteristics due to a large specific surface area, and has excellent cycle-life characteristics due to alleviation of volume changes during charge and discharge.

The etching solution may include hydrogen peroxide ($H_2O_2$), hydrogen fluoride (HF), potassium hydroxide (KOH), sodium hydroxide (NaOH), nitric acid ($HNO_3$), potassium permanganate ($KMnO_4$), isopropyl alcohol (IPA), or a combination thereof, but is not limited thereto.

For example, the material being capable of doping and dedoping lithium may be dipped in the etching solution, and thereby the material being capable of doping and dedoping lithium is etched to form a pore.

By controlling concentrations and use amounts of the etching solution, and dipping times, sizes or shapes of pores formed by the etching may be controlled.

The etching solution may have a concentration of about 1 to about 10 M. Specifically, the etching solution may have a concentration of about 2 to about 8 M, about 2 to about 6 M, about 3 to about 7 M, or about 3 to about 8 M. When the etching solution has a concentration within the range, the etch rate may be increased, and lengths and diameters of pores may be effectively controlled.

The material being capable of doping and dedoping lithium may be prepared by etching the material being capable of doping and dedoping lithium using an etching solution and a catalyst to form a pore in the material being capable of doping and dedoping lithium.

The catalyst may include a metal.

The metal may include gold, silver, platinum, copper, nickel, aluminum, or a combination thereof, but is not limited thereof.

When the catalyst is used, the material being capable of doping and dedoping lithium may be selectively etched. Thereby, a preparation process of the negative active material for a rechargeable lithium battery may be simplified and thus processibility and economy may be improved.

Specifically, the material being capable of doping and dedoping lithium may be prepared by supporting a metal particle on a surface of the material being capable of doping and dedoping lithium, and etching the material being capable of doping and dedoping lithium on which the metal particle is supported.

The metal particle may be present in a form of a particle on the surface of the material being capable of doping and dedoping lithium, and the metal particle may function as a catalyst during etching. Thereby, during etching, a lower part where the metal particle is present on the material being capable of doping and dedoping lithium in a form of a particle is etched and thus a pore is formed.

The metal particle may include gold, silver, platinum, copper, nickel, aluminum, or a combination thereof, but is not limited thereto.

The metal particle may be supported on the surface of the material being capable of doping and dedoping lithium by using electroless plating, physical vapor deposition, chemical vapor deposition, thermal deposition, e-beam deposition, sputtering, a method using an organic capping agent, or a combination thereof, without limitation.

After etching the material being capable of doping and dedoping lithium on which the metal particle is supported, the etched material being capable of doping and dedoping lithium may be washed. During washing, reaction products between the material being capable of doping and dedoping lithium and the etching solution, remaining metal particles, and remaining etching solutions may be removed.

For example, the washing process may be performed by dipping a powder including the etched material being capable of doping and dedoping lithium in a solution including water, a nitric acid aqueous solution, alcohol, acetone, or a combination thereof. The process of washing may be performed by changing a washing solution one or more times, and when the washing process is performed in plural, filtering and drying may be further performed between washing steps. The process of drying may be performed under vacuum, at a temperature of about 100° C. to about 250° C., without limitation.

The oxide layer of the material being capable of doping and dedoping lithium is the same as the negative active material for a rechargeable lithium battery according to one embodiment of the present invention described above.

The process of heat-treating the material being capable of doping and dedoping lithium to form an oxide layer of the material being capable of doping and dedoping lithium on the exterior of the material being capable of doping and dedoping lithium may be performed under an air atmosphere.

The process of heat-treating the material being capable of doping and dedoping lithium to form an oxide layer of the material being capable of doping and dedoping lithium on the exterior of the material being capable of doping and dedoping lithium may be performed at about 500 to about 1000° C. Specifically, the process of heat-treating may be performed at about 500 to about 900° C., about 600 to about 1000° C., about 600 to about 900° C., about 700 to about 1000° C., about 700 to about 900° C., about 800 to about 1000° C., about 800 to about 900° C., and more specifically about 800° C. Within the above temperature range, a thickness of the oxide layer of the material being capable of doping and dedoping lithium may be easily controlled.

The oxide layer of the material being capable of doping and dedoping lithium is formed on the exterior of the material being capable of doping and dedoping lithium, and thereby, pulverization of the material being capable of doping and dedoping lithium may be suppressed or alleviated effectively and a side reaction between the material being capable of doping and dedoping lithium and an electrolyte may be suppressed or alleviated effectively even though the volume of the material being capable of doping and dedoping lithium changes by lithium intercalation and deintercalation.

The carbon layer is the same as the negative active material for rechargeable lithium battery according to one embodiment of the present invention described above.

The process of forming a carbon layer on the exterior of the oxide layer of the material being capable of doping and dedoping lithium may be performed by mixing the material being capable of doping and dedoping lithium formed on the exterior of the oxide layer of the material being capable of doping and dedoping lithium, and a carbon raw material.

For example, the process of forming a carbon layer on the exterior of the oxide layer of the material being capable of doping and dedoping lithium may be performed by making a hydrocarbon gas flow at a high temperature and under an inert atmosphere. Herein, the hydrocarbon gas may be an acetylene gas, an ethylene gas, or a combination thereof.

The process of forming a carbon layer is not limited thereto, and another method and other materials may be used.

For example, the carbon raw material may include an acetylene gas, an ethylene gas, sucrose, glucose, polyacrylonitrile, polyvinyl alcohol, polyvinylpyrrolidone, colloidal carbon, citric acid, tartaric acid, glycolic acid, polyacrylic acid, adipic acid, glycine, or a combination thereof.

Another method of forming the carbon layer may be a carbonization method, a spray pyrolysis method, a layer-by-layer assembly method, a dip coating method, or a combination thereof.

The process of forming a carbon layer on the exterior of the oxide layer of the material being capable of doping and dedoping lithium may further include a heat treatment.

The heat treatment may be performed at about 800 to about 1000° C. Specifically, the heat treatment may be performed at about 800 to about 950° C., or about 850 to about 900° C. Within the heat-treating temperature ranges, a thickness of the carbon layer may be easily controlled.

The process of forming a carbon layer on the exterior of the oxide layer of the material being capable of doping and dedoping lithium may be performed under a nitrogen or inert gas atmosphere. The inert gas may be argon gas.

The carbon layer is formed on the exterior of the oxide layer of the material being capable of doping and dedoping lithium, and thereby the carbon layer may suppress or alleviate pulverization of the material being capable of doping and dedoping lithium effectively and a side reaction between the material being capable of doping and dedoping lithium and an electrolyte may be suppressed or alleviated effectively, even though the volume of the material being capable of doping and dedoping lithium changes by lithium intercalation and deintercalation. The negative active material for a rechargeable lithium battery has excellent conductivity, and thus easily reacts with lithium. Furthermore, the rechargeable lithium battery including such a negative active material may have improved cycle-life characteristics and high rate capability, and may prevent capacity fading.

In yet another embodiment of the present invention, a rechargeable lithium battery includes a negative electrode including the negative active material for a rechargeable lithium battery, a positive electrode including a positive active material, a separator interposed between the negative electrode and positive electrode, and an electrolyte.

The rechargeable lithium battery may be classified as a lithium ion battery, a lithium ion polymer battery, and a lithium polymer battery according to the presence of a separator and the kind of an electrolyte used therein. The rechargeable lithium battery may have a variety of shapes and sizes, and thus may include a cylindrical, prismatic, coin, or pouch-type battery and a thin film type or a bulky type. Structures and manufacturing methods for lithium ion batteries pertaining to this disclosure are well known in the art.

FIG. 1 is an exploded perspective view of a rechargeable lithium battery according to one embodiment. Referring to FIG. 1, the rechargeable lithium battery 100 is a cylindrical battery including a negative electrode 112, a positive electrode 114, and a separator 113 interposed between the negative electrode 112 and positive electrode 114, an electrolyte (not shown) impregnated in the negative electrode 112, positive electrode 114, and separator 113, a battery case 120, and a sealing member 140 sealing the battery case 120. The rechargeable lithium battery 100 is manufactured by sequentially laminating a negative electrode 112, a positive electrode 114, and a separator 113, spirally winding them, and housing the spirally-wound product in the battery case 120.

The negative electrode includes a current collector and a negative active material layer formed on the current collector, and the negative active material layer includes a negative active material.

The negative active material is the same as described above.

The negative active material layer may include a binder, and optionally a conductive material.

The binder improves properties of binding active material particles with one another and a negative active material with a current collector. Examples thereof may include polyvinyl alcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves electrical conductivity of an electrode. Any electrically conductive material may be used as a conductive material, unless it causes a chemical change. Examples thereof may include a carbon-based material such as natural graphite, artificial graphite, carbon black, acetylene black, ketjen black, carbon fiber and the like; a metal-based material of a metal powder or a metal fiber including copper, nickel, aluminum, silver, and the like; a conductive polymer such as a polyphenylene derivative, and the like; or a mixture thereof.

The current collector may include a copper foil, a nickel foil, a stainless steel foil, a titanium foil, a nickel foam, a copper foam, a polymer substrate coated with a conductive metal, or a combination thereof.

The positive electrode includes a current collector and a positive active material layer formed on the current collector.

The positive active material includes lithiated intercalation compounds that reversibly intercalate and deintercalate lithium ions. The positive active material may include a composite oxide including at least one selected from cobalt, manganese, and nickel, as well as lithium. Specific examples may be the compounds represented by the following chemical formulae:

$Li_aA_{1-b}R_bD_2$ (wherein, in the above chemical formula, $0.90 \le a \le 1.8$ and $0 \le b \le 0.5$); $Li_aE_{1-b}R_bO_{2-c}D_c$ (wherein, in the above chemical formula, $0.90 \le a \le 1.8$, $0 \le b \le 0.5$, and $0 \le c \le 0.05$); $LiE_{2-b}R_bO_{4-c}D_c$ (wherein, in the above chemical formula, $0 \le b \le 0.5$ and $0 \le c \le 0.05$); $Li_aNi_{1-b-c}Co_bR_cD_\alpha$ (wherein, in the above chemical formula, $0.90 \le a \le 1.8$, $0 \le b \le 0.5$, $0 \le c \le 0.05$, and $0 < \alpha \le 2$); $Li_aNi_{1-b-c}Co_bR_cO_{2-\alpha}Z_\alpha$ (wherein, in the above chemical formula, $0.90 \le a \le 1.8$, $0 \le b \le 0.5$, $0 \le c \le 0.05$, and $0 < \alpha < 2$); $Li_aNi_{1-b-c}Co_bR_cO_{2-\alpha}Z_2$ (wherein, in the above chemical formula, $0.90 \le a \le 1.8$, $0 \le b \le 0.5$, $0 \le c \le 0.05$, and $0 < \alpha < 2$); $Li_aNi_{1-b-c}Mn_bR_cD_\alpha$ (wherein, in the above chemical formula, $0.90 \le a \le 1.8$, $0 \le b \le 0.5$, $0 \le c \le 0.05$, and $0 < \alpha \le 2$); $Li_aNi_{1-b-c}Mn_bR_cO_{2-\alpha}Z_\alpha$ (wherein, in the above chemical formula, $0.90 \le a \le 1.8$, $0 \le b \le 0.5$, $0 \le c \le 0.05$, and $0 < \alpha < 2$); $Li_aNi_{1-b-c}Mn_bR_cO_{2-\alpha}Z_2$ (wherein, in the above chemical formula, $0.90 \le a \le 1.8$, $0 \le b \le 0.5$, $0 \le c \le 0.05$, and $0 < \alpha < 2$); $Li_aNi_bE_cG_dO_2$ (wherein, in the above chemical formula, $0.90 \le a \le 1.8$, $0 \le b \le 0.9$, $0 \le c \le 0.5$, and $0.001 \le d \le 0.1$); $Li_aNi_bCo_cMn_dGeO_2$ (wherein, in the above chemical formula, $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein, in the above chemical formula, $0.90 \le a \le 1.8$ and $0.001 \le b \le 0.1$); $Li_aCoG_bO_2$ (wherein, in the above chemical formula, $0.90 \le a \le 1.8$ and $0.001 \le b \le 0.1$); $Li_aMnG_bO_2$ (wherein, in the above chemical formula, $0.90 \le a \le 1.8$ and $0.001 \le b \le 0.1$); $Li_aMn_2G_bO_4$ (wherein, in the above chemical formula, $0.90 \le a \le 1.8$ and $0.001 \le b \le 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The positive active material may be a compound with the coating layer on the surface or a mixture of the active material and a compound with the coating layer thereon. The coating layer may include at least one coating element compound selected from an oxide and a hydroxide of the coating element, an oxyhydroxide of the coating element, an oxycarbonate of the coating element, and a hydroxycarbonate of the coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any conventional processes unless it causes any side effects on the properties of the positive active material (e.g., spray coating, immersing), which is well known to those who have ordinary skill in this art and will not be illustrated in detail.

The positive active material layer includes a binder and a conductive material.

The binder improves binding properties of the positive active material particles to one another and to a current collector. Examples of the binder include polyvinyl alcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves conductivity of an electrode. Any electrically conductive material may be used as a conductive material, unless it causes a chemical change. Examples of the conductive material include natural graphite, artificial graphite, carbon black, acetylene black, ketjen black, carbon fiber, a metal powder, or a metal fiber of copper, nickel, aluminum, silver, and the like, a conductive material such as a polyphenylene derivative, and the like.

The current collector may be Al, but is not limited thereto.

The negative electrode and positive electrode may be manufactured in a method of preparing an active material composition by mixing the active material and a binder, and optionally a conductive material, and coating the active material composition on a current collector. The electrode manufacturing method is well known, and thus is not described in detail in the present specification. The solvent includes N-methylpyrrolidone and the like, but is not limited thereto.

The electrolyte includes a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropinonate, ethylpropinonate, γ-butyrolactone, decanolide, valerolactone, mevalonolactone, caprolactone, and the like. The ether-based solvent may include dimethyl ether, dibutyl ether, tetraglyme, diglyme, dimethoxyethane, 2-methyltetrahydrofuran, tetrahydrofuran (THF), and the like. The ketone-based solvent may include cyclohexanone and the like. The alcohol-based solvent may include ethanol, isopropyl alcohol, and the like. The aprotic solvent include nitriles such as R—CN (wherein R is a C2 to C20 linear, branched, or cyclic hydrocarbon group, and may include one or more double bonds, one or more aromatic rings, or one or more ether bonds), amides such as dimethylformamide and dimethylacetamide, dioxolanes such as 1,3-dioxolane, sulfolanes, and the like.

The non-aqueous organic solvent may be used singularly or in a mixture, and when the organic solvent is used in a mixture, the mixture ratio may be controlled in accordance with a desirable battery performance.

The carbonate-based solvent may include a mixture of a cyclic carbonate and a linear carbonate. The cyclic carbonate and the linear carbonate are mixed together in a volume ratio of about 1:1 to about 1:9. Within this range, performance of the electrolyte may be improved.

The non-aqueous organic solvent may be prepared by further adding the aromatic hydrocarbon-based solvent to the carbonate-based solvent. The carbonate-based solvent and the aromatic hydrocarbon-based solvent are mixed together in a volume ratio of about 1:1 to about 30:1.

The aromatic hydrocarbon-based organic solvent may be an aromatic hydrocarbon-based compound represented by the following Chemical Formula 2.

[Chemical Formula 2]

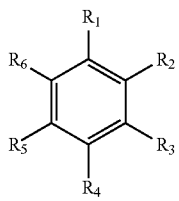

In the above Chemical Formula 2, $R_1$ to $R_6$ are each independently hydrogen, a halogen, a C1 to C10 alkyl group, a C1 to C10 haloalkyl group, or a combination thereof.

The aromatic hydrocarbon based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound represented by the following Chemical Formula 3 in order to improve cycle-life of a battery.

[Chemical Formula 3]

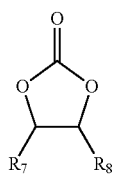

In the above Chemical Formula 3, $R_7$ and $R_8$ are each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

Examples of the ethylene carbonate-based compound include difluoro ethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the vinylene carbonate or the ethylene carbonate-based compound may be adjusted within an appropriate range in order to improve cycle-life.

The lithium salt is dissolved in the non-aqueous solvent and supplies lithium ions in a rechargeable lithium battery, and basically operates the rechargeable lithium battery and improves lithium ion transfer between positive and negative electrodes. Examples of the lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, LiCl, LiI, $LiB(C_2O_4)_2$ (lithium bis(oxalato) borate, LiBOB), and a combination thereof, which may be used as a supporting electrolytic salt. The lithium salt may be used in a concentration of about 0.1 to about 2.0 M. When the lithium salt is included at the above concentration range, an electrolyte may have excellent performance and lithium ion mobility due to optimal electrolyte conductivity and viscosity.

The separator 113 may include any materials commonly used in the conventional lithium battery, as long as they separate the negative electrode 112 from the positive electrode 114 and provide a transporting passage for lithium ions. In other words, the separator may be made of a material having low resistance to ion transportation and excellent impregnation for an electrolyte. For example, the material may be selected from glass fiber, polyester, TEFLON (tetrafluoroethylene), polyethylene, polypropylene, polytetrafluoroethylene (PTFE), or a combination thereof, and have a form of a non-woven fabric or a woven fabric. For example, a polyolefin-based polymer separator such as polyethylene, polypropylene, or the like is mainly used for a lithium ion battery. In order to ensure heat resistance or mechanical strength, a coated separator including a ceramic component or a polymer material may be used, and may selectively have a mono-layered or multi-layered structure.

Hereinafter, an exemplary embodiment of the present invention and comparative examples will be described. These examples, however, are not in any sense to be interpreted as limiting the scope of the invention.

Preparation of Negative Active Material for Rechargeable Lithium Battery

Example 1

Porous silicon was prepared by putting 250 mL of hydrogen fluoride (HF, 5%) into a 1 L reaction container, mixing it with 250 mL of a silver nitrate ($AgNO_3$, 10 mM) aqueous solution, adding 10 g of silicon powder thereto, and reacting the mixture at room temperature for 6 hours. The resultant was reacted in a 5 M nitric acid solution at 50° C. for 2 hours to remove the silver nitrate.

Then, 5 g of the porous silicon was reacted at 800° C. for 1 hour under an air atmosphere to introduce a silica layer on the surface. In this way, a core-shell-shaped particle having the silica shell on the porous silicon as a core was synthesized.

The core-shell-shaped particle was put into a tube under an argon atmosphere, and then a carbon layer was introduced thereinto at 900° C., while acetylene gas flowed in the tube. In this way, a core-double shell-shaped negative active material for a rechargeable lithium battery having the silicon as a core, the silica layer as a first shell, and the carbon layer as a second shell was manufactured.

Comparative Example 1

Porous silicon was prepared by putting 250 mL of hydrogen fluoride (HF, 5%) in a 1 L reaction container, mixing it with 250 mL of a silver nitride ($AgNO_3$, 10 mM) aqueous solution, adding 10 g of silicon powder thereto, and reacting the mixture at room temperature for 6 hours. The resultant was reacted in a 5 M silver nitric acid solution at 50° C. for 2 hours to remove the silver nitrate. In this way, the porous silicon was prepared to be included in a negative active material for a rechargeable lithium battery.

Comparative Example 2

Porous silicon was prepared by putting 250 mL of hydrogen fluoride (HF, 5%) in a 1 L reaction container, mixing it with 250 mL of a silver nitride (AgNO$_3$, 10 mM) aqueous solution, adding 10 g of silicon powder thereto, and reacting the mixture at room temperature for 6 hours. The resultant was reacted at 50° C. for 2 hours in a 5 M silver nitric acid solution to remove the silver nitrate.

Subsequently, 5 g of the porous silicon was reacted at 800° C. for 1 hour under an air atmosphere to introduce a silica layer on the surface. In this way, a core-shell-shaped negative active material having the silicon as a core and the silica layer as a shell was prepared.

Manufacture of Rechargeable Lithium Battery Cell (Half-Cell)

Example 2

70 wt % of the negative active material according to Example 1, 10 wt % of super P carbon black as a conductive material, and 20 wt % of a mixture of polyacrylic acid (PAA) and carboxylmethyl cellulose (CMC) as a binder were dispersed in a water solvent, preparing a negative electrode slurry. The negative electrode slurry was coated on a copper foil and then dried and compressed, manufacturing a negative electrode. Then, a half-cell was manufactured by using an aluminum foil as a counter electrode, interposing a polyethylene separator between the negative electrode and the counter electrode, and injecting an electrolyte solution prepared by dissolving 1.3 M LiPF$_6$ in a mixed solvent prepared by mixing ethylene carbonate (EC) and ethylmethyl carbonate (EMC) or ethylene carbonate (EC) and diethylcarbonate (DEC) in a volume ratio of 3:7.

Comparative Example 3

A rechargeable lithium battery cell was manufactured according to the same method as Example 2 except for using the negative active material according to Comparative Example 1.

Comparative Example 4

A rechargeable lithium battery cell was manufactured according to the same method as Example 2 except for using the negative active material according to Comparative Example 2.

Experimental Example 1

Scanning Electron Microscope (SEM) Photograph

SEM photographs of the negative active materials according to Example 1 and Comparative Example 2 were taken.

Figure 2:
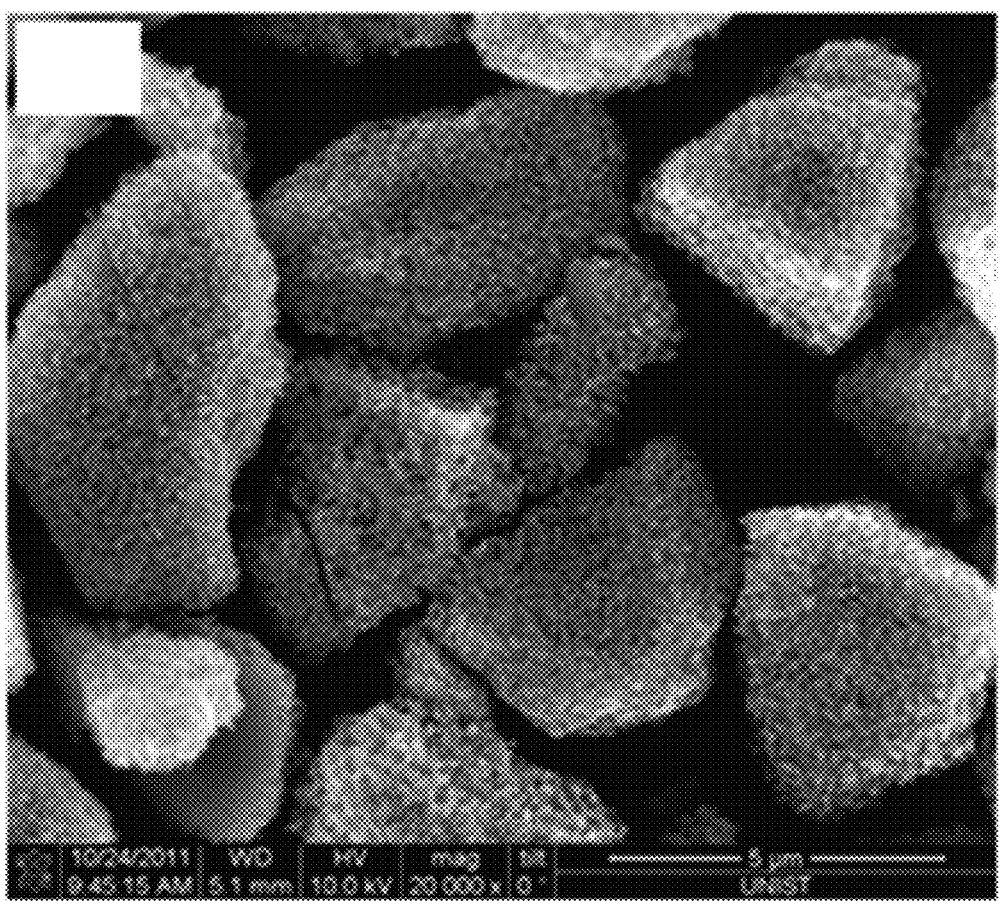
FIG. 2 is a scanning electron microscope (SEM) photograph showing a negative active material according to Comparative Example 2.
Figure 3:
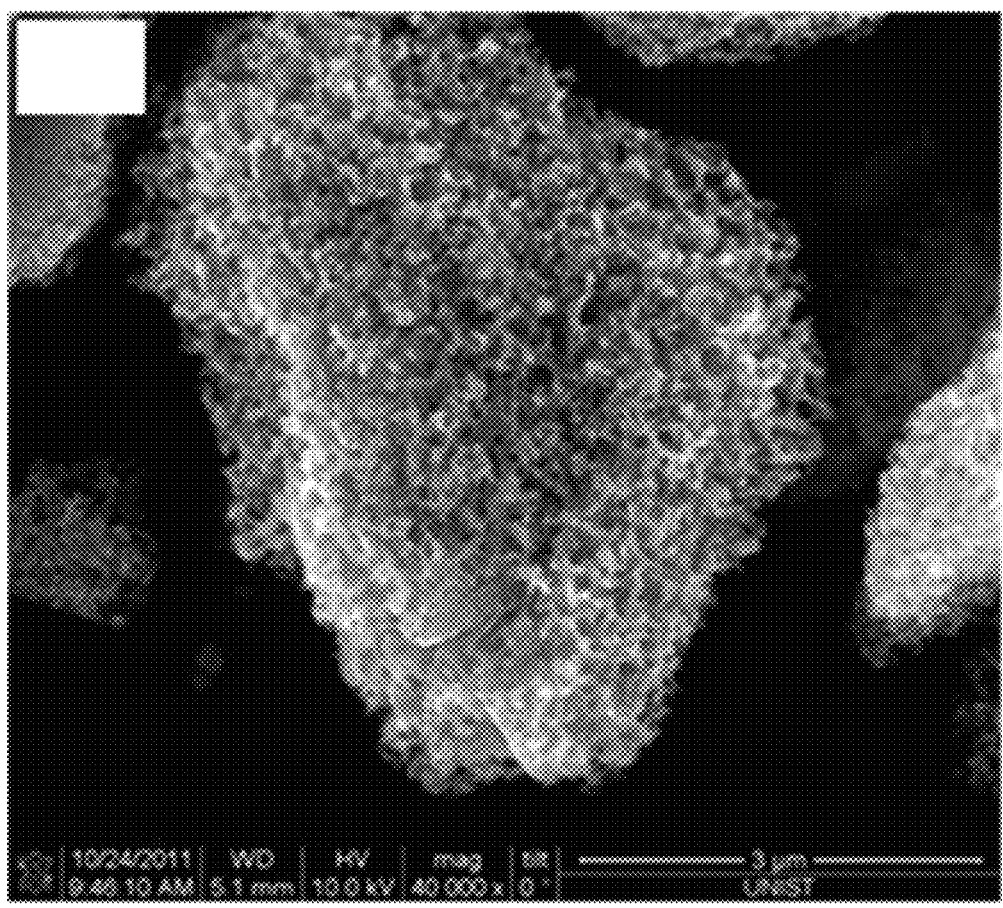
FIG. 3 is a SEM photograph enlarging the photograph of FIG. 2.

FIG. 2 is a SEM photograph showing the negative active material according to Comparative Example 2. Referring to FIG. 2, the surface shape of the negative active material according to Comparative Example 2 was examined. FIG. 3 is a photograph enlarging the photograph in FIG. 2. Referring to FIG. 3, the negative active material according to Comparative Example 2 had pores.

Figure 4:
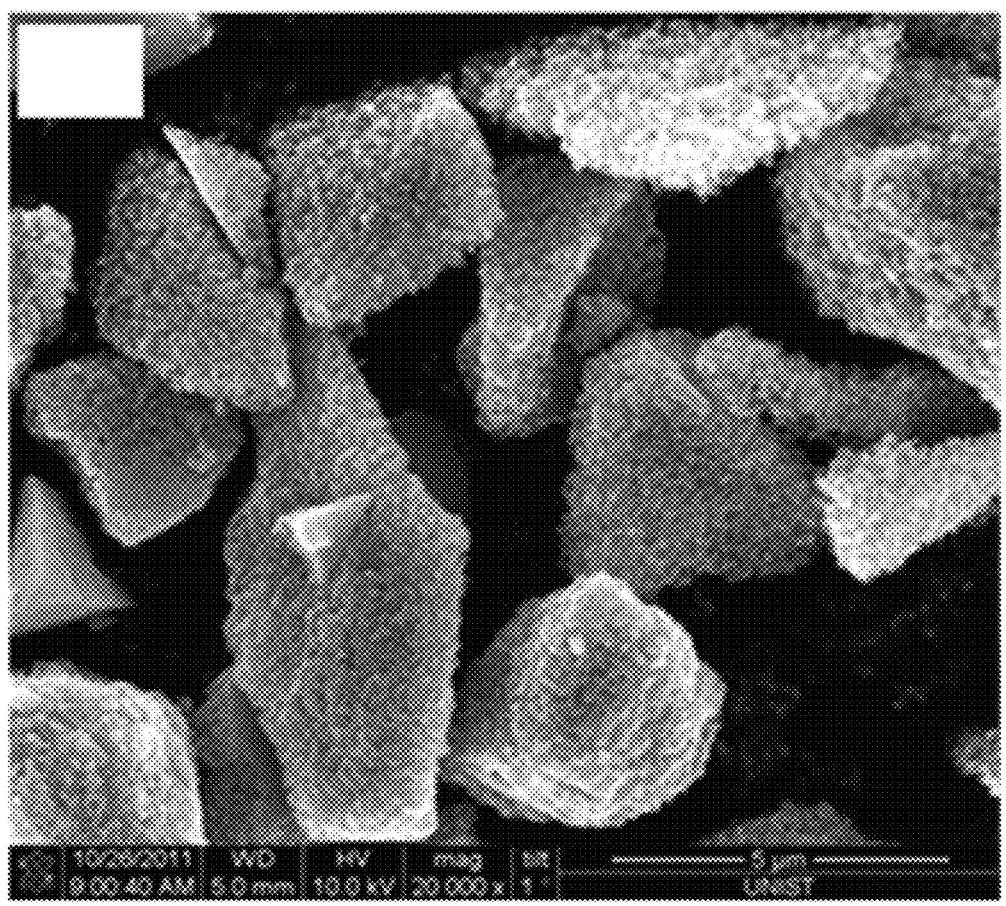
FIG. 4 is a SEM photograph showing a negative active material according to Example 1.
Figure 5:
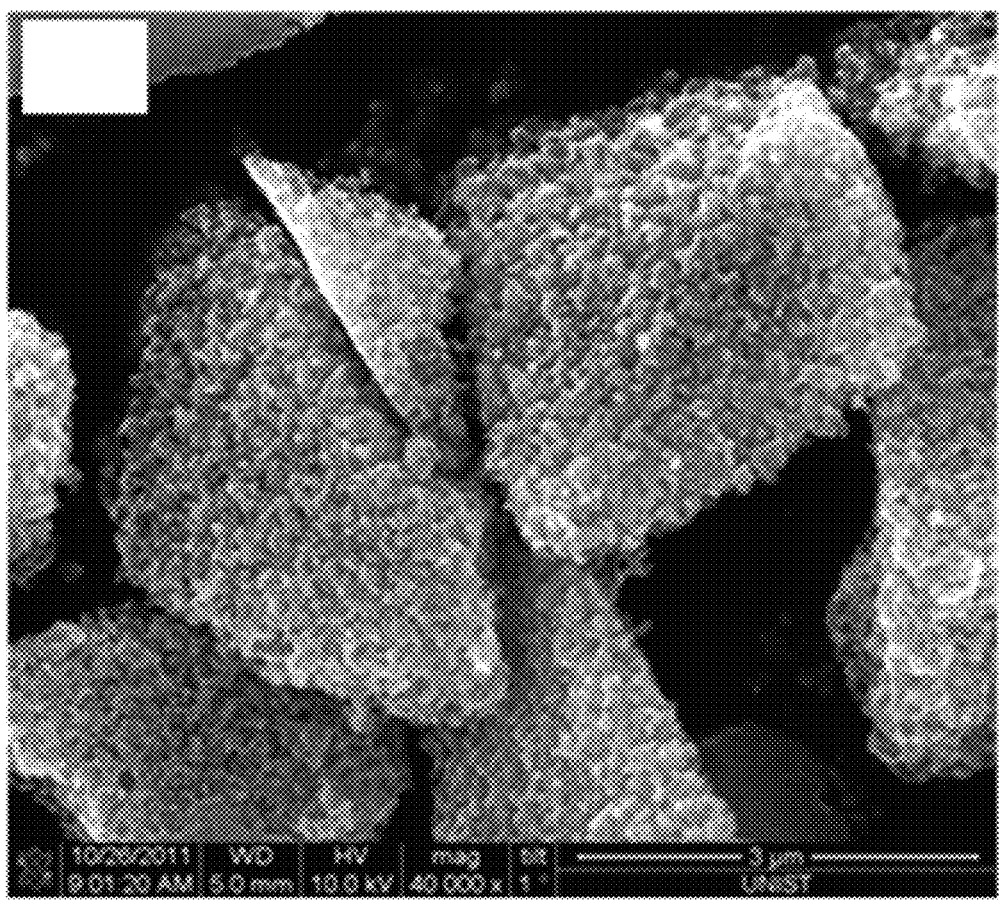
FIG. 5 is a SEM photograph enlarging the photograph of FIG. 4.

FIG. 4 is a SEM photograph showing the negative active material according to Example 1. Referring to FIG. 4, the surface shape of the negative active material according to Example 1 was examined. FIG. 5 is a photograph enlarging the photograph of FIG. 4. Referring to FIG. 5, the negative active material according to Example 1 had pores.

Comparing FIG. 3 with FIG. 5, the negative active material according to Example 1 had smaller pores than the negative active material according to Comparative Example 2.

Experimental Example 2

X-ray Diffraction Analysis

Figure 6:
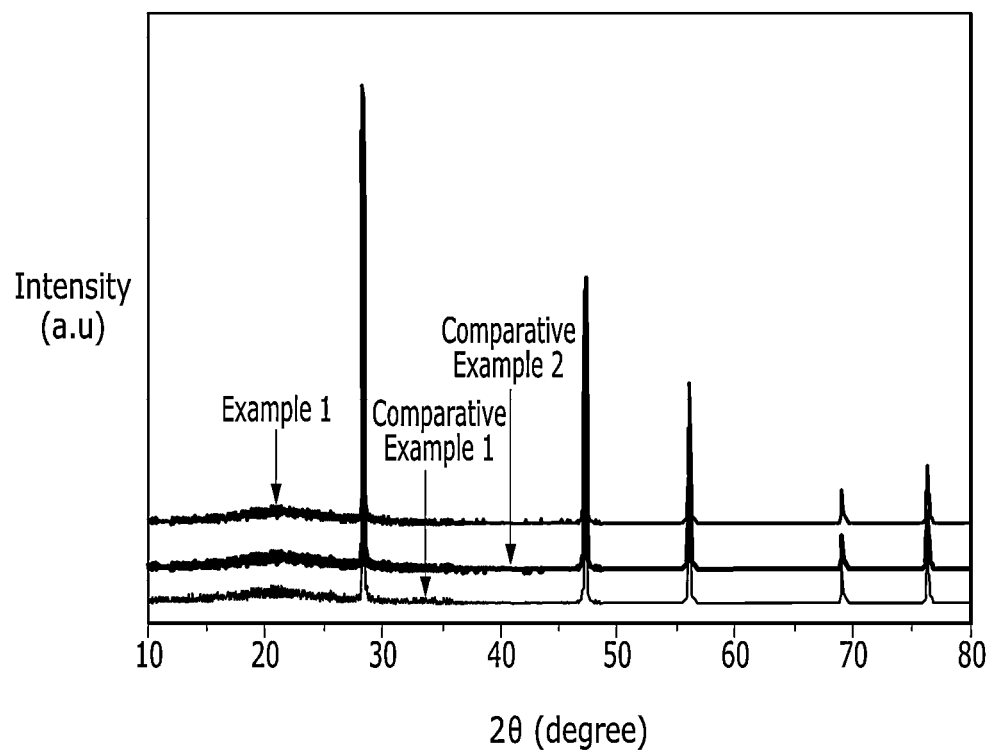
FIG. 6 shows an X-ray diffraction graph of the negative active material for a rechargeable lithium battery.

FIG. 6 shows an X-ray diffraction graph of the negative active materials according to Example 1 and Comparative Examples 1 and 2. The X-ray diffraction analysis used CuKα as a light source. In FIG. 6, the lowest plot shows the negative active material according to Comparative Example 1, the middle plot shows the negative active material according to Comparative Example 2, and the top plot shows the negative active material according to Example 1. Referring to FIG. 6, the negative active materials according to Example 1 and Comparative Example 2 had a thicker SiOx layer than the negative active material according to Comparative Example 1. In addition, FIG. 6 shows that the negative active materials according to Example 1 and Comparative Example 2 had the same X-ray diffraction result. This result shows that a carbon layer had no influence on the core and first shell structure of the negative active material according to Example 1 even though the carbon layer was formed on the negative active material.

Experimental Example 3

Raman Spectroscopy Analysis

Figure 7:
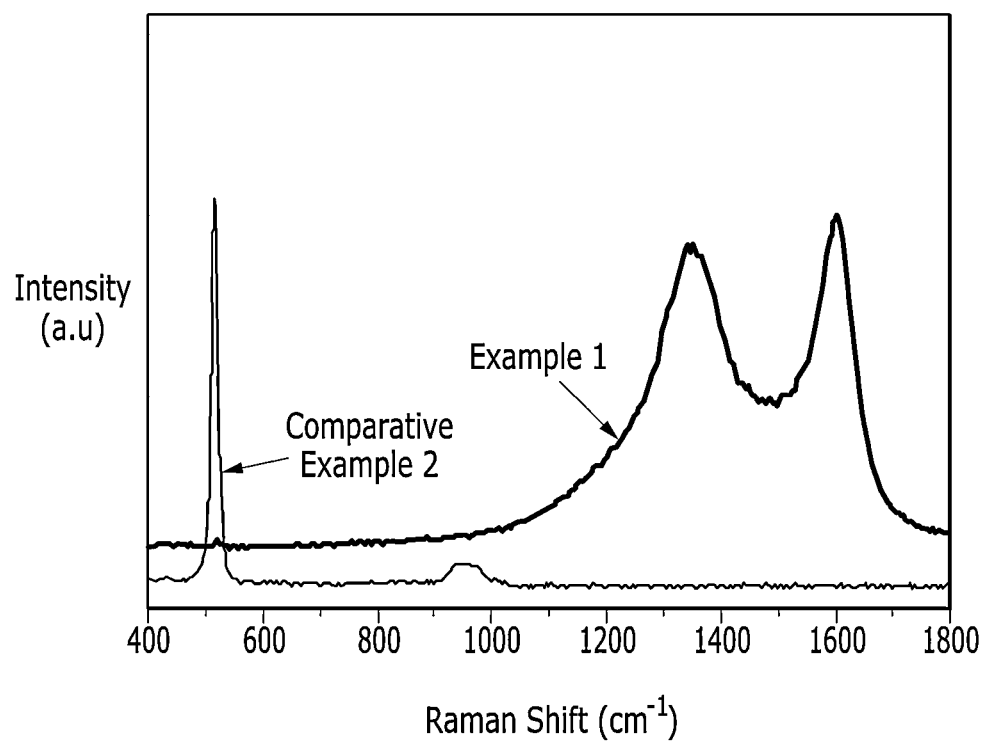
FIG. 7 shows a Raman spectrum of the negative active materials for a rechargeable lithium battery.

FIG. 7 shows Raman spectra of the negative active materials according to Example 1 and Comparative Example 2. The Raman spectroscopy analysis was performed by using a He—Ne Laser and a wavelength of 632.8 nm. Referring to FIG. 7, the carbon layer included in the negative active material according to Example 1 had an amorphous structure.

Experimental Example 4

Charge and Discharge Efficiency of Rechargeable Lithium Battery Cell

Figure 8:
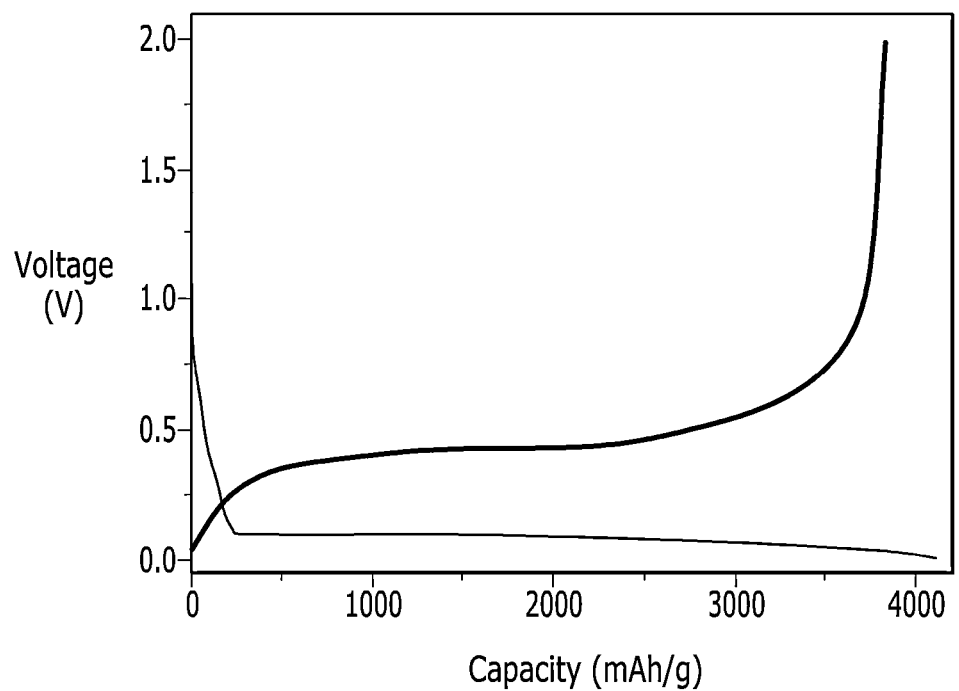
FIG. 8 is a graph charge and discharge capacity of rechargeable lithium batteries.

FIG. 8 is a graph showing charge and discharge capacity of the rechargeable lithium battery cell according to Example 2. The rechargeable lithium battery cell had discharge capacity of 4120 mAh/g and charge capacity of 3830 mAh/g, and thus high Coulomb efficiency of 93% referring to a voltage profile at a rate of 0.1 C. FIG. 8 shows that the negative active material according to Example 1 had sufficient electrical conductivity.

Experimental Example 5

Cycle-life Characteristics of Rechargeable Lithium Battery Cell

Figure 9:
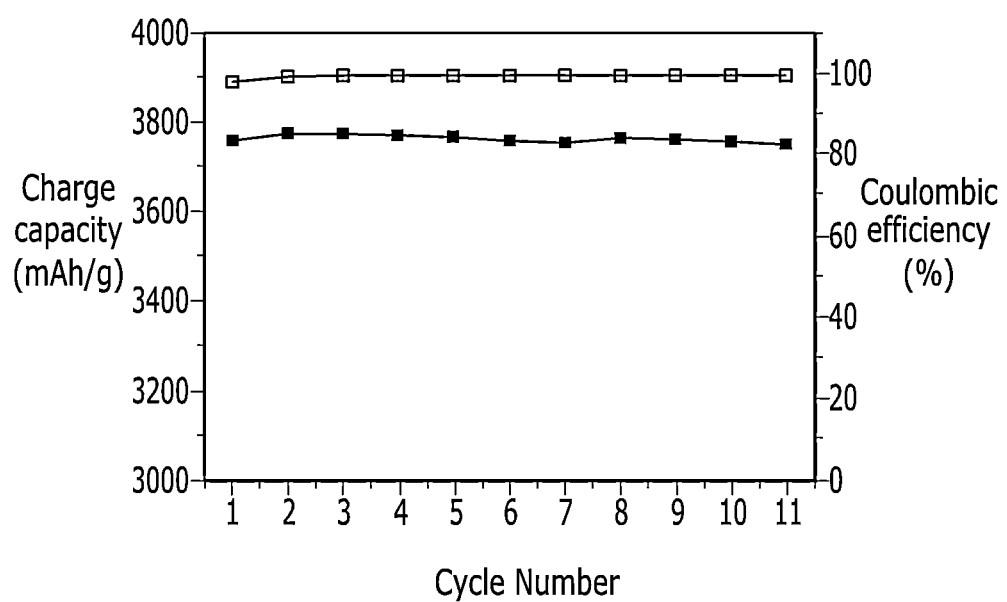
FIG. 9 is a graph showing cycle-life characteristics of the rechargeable lithium battery cell according to Example 2.

FIG. 9 is a graph showing cycle-life characteristics of the rechargeable lithium battery cell according to Example 2. In FIG. 9, the empty dotted line indicates charge capacity, while the solid dotted line indicates coulomb efficiency. The rechargeable lithium battery cell had no capacity difference at the first cycle and the eleventh cycle. FIG. 9 shows that the rechargeable lithium battery cell according to Example 2 had improved cycle-life characteristics.

Figure 10:
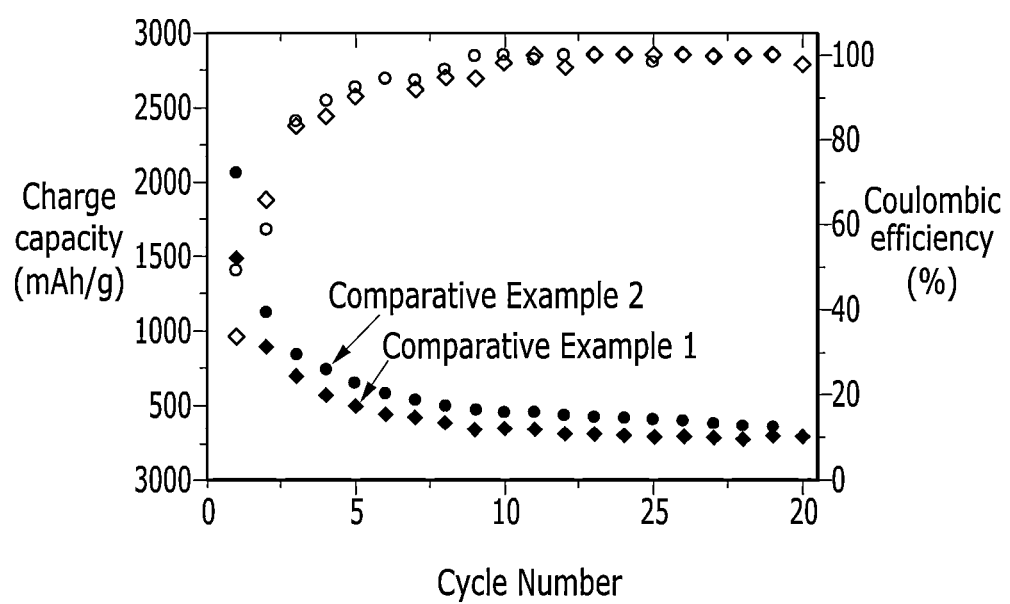
FIG. 10 is a graph showing cycle-life characteristics of the rechargeable lithium battery cells according to Comparative Examples 3 and 4.

FIG. 10 is a graph showing cycle-life characteristics of the rechargeable lithium battery cells according to Comparative Examples 3 and 4. In FIG. 10, the solid dotted line indicates charge capacity, while the empty dotted line indicates coulomb efficiency. In FIG. 10, the rhombus-shaped dotted line is a curve showing the rechargeable lithium battery cell according to Comparative Example 1, while the circle-shaped dotted line is a curve showing the rechargeable lithium battery cell according to Comparative Example 2.

Referring to FIG. 10, the rechargeable lithium battery cells according to Comparative Examples 3 and 4 had insufficient cycle-life characteristics compared with the rechargeable lithium battery cell according to Example 2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

| 100: rechargeable lithium battery | 112: negative electrode |
| 113: separator | 114: positive electrode |
| 120: battery case | 140: sealing member |

What is claimed is:

1. A negative active material for rechargeable lithium battery, comprising:
    a core including a material being capable of doping and dedoping lithium;
    an oxide layer of the material being capable of doping and dedoping lithium formed on the exterior of the core including a material being capable of doping and dedoping lithium; and
    a carbon layer formed on the exterior of the oxide layer of the material being capable of doping and dedoping lithium,
    wherein the oxide layer of the material being capable of doping and dedoping lithium comprises a compound represented by the following Chemical Formula 1:

$$Si_xM_yO_z \qquad \text{[Chemical Formula 1]}$$

wherein, in the above Chemical Formula 1,
    M is an alkali metal, an alkaline-earth metal, a Group 13 to 16 element, a transition metal, a rare earth element, or a combination thereof, and
    $0.9 \leq x \leq 0.99$, $0 \leq y \leq 0.05$, and $0.01 \leq z \leq 0.1$.

2. The negative active material of claim 1, wherein the material being capable of doping and dedoping lithium comprises Si, $SiO_{x1}$, a Si—C composite, a Si-Q alloy, Sn, $SnO_{x2}$, a Sn—C composite, Sn—R, or a combination thereof,  wherein the x1 and x2 are in the ranges of $0 < x1 < 2$ and $0 < x2 < 2$,
    the Q is an alkali metal, an alkaline-earth metal, a Group 13 to 16 element, a transition metal, a rare earth element, or a combination thereof, and excludes Si from the Q, and
    the R is an alkali metal, an alkaline-earth metal, a Group 13 to 16 element, a transition metal, a rare earth element, or a combination thereof, and excludes Sn from the R.

3. The negative active material of claim 1, wherein the oxide layer of the material being capable of doping and dedoping lithium has a thickness of about 5 nm to about 30 nm.

4. The negative active material of claim 1, wherein the carbon layer has a thickness of about 5 nm to about 50 nm.

5. The negative active material of claim 1, wherein the negative active material for rechargeable lithium battery is porous.

6. A rechargeable lithium battery, comprising:
    for a rechargeable lithium battery according to claim 1;
    a positive electrode including a positive active material;
    a separator interposed between the negative electrode and positive electrode; and
    an electrolyte.

7. A rechargeable lithium battery, comprising:
    the negative electrode including a negative active material for a rechargeable lithium battery prepared by a process comprising:
    preparing a material being capable of doping and dedoping lithium;
    heat-treating the material being capable of doping and dedoping lithium to form an oxide layer of the material being capable of doping and dedoping lithium on the exterior of the material being capable of doping and dedoping lithium; and
    forming a carbon layer on the exterior of the oxide layer of the material being capable of doping and dedoping lithium;
    a positive electrode including a positive active material;
    a separator interposed between the negative electrode and positive electrode; and an electrolyte,
    wherein the oxide layer of the material being capable of doping and dedoping lithium comprises a compound represented by the following Chemical Formula 1:

$$Si_xM_yO_z \qquad \text{[Chemical Formula 1]}$$

wherein, in the above Chemical Formula 1,
    M is an alkali metal, an alkaline-earth metal, a Group 13 to 16 element, a transition metal, a rare earth element, or a combination thereof, and
    $0.9 \leq x \leq 0.99$, $0 \leq y \leq 0.05$, and $0.01 \leq z \leq 0.1$.

\* \* \* \* \*